(12) United States Patent
 Shimizu (10) Patent No.: US 9,032,178 B2
(45) Date of Patent: May 12, 2015

(54) ELECTRONIC APPARATUS FOR MEMORY ALLOCATION AND REORGANIZATION

(71) Applicant: Takafumi Shimizu, Kanagawa (JP)

(72) Inventor: Takafumi Shimizu, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 250 days.

(21) Appl. No.: 13/773,790

(22) Filed: Feb. 22, 2013

(65) Prior Publication Data

US 2013/0227241 A1    Aug. 29, 2013

(30) Foreign Application Priority Data

Feb. 28, 2012   (JP) .................................. 2012-041534

(51) Int. Cl.
 *G06F 12/02*   (2006.01)
(52) U.S. Cl.
 CPC ...... *G06F 12/023* (2013.01); *G06F 2212/7205* (2013.01)
(58) Field of Classification Search
 None
 See application file for complete search history.

(56) References Cited

U.S. PATENT DOCUMENTS

| 5,572,730 A | 11/1996 | Oda | |
|---|---|---|---|
| 6,629,227 B1 * | 9/2003 | Jerding et al. | 711/170 |
| 2006/0085433 A1 * | 4/2006 | Bacon et al. | 707/100 |
| 2007/0266220 A1 * | 11/2007 | Nelson | 711/170 |
| 2011/0197196 A1 * | 8/2011 | Felton et al. | 718/104 |

FOREIGN PATENT DOCUMENTS

| JP | H05-066989 | 3/1993 |
|---|---|---|
| JP | 2005-025727 | 1/2005 |

* cited by examiner

*Primary Examiner* — Jared Rutz
*Assistant Examiner* — Jason Blust
(74) *Attorney, Agent, or Firm* — Harness, Dickey & Pierce, P.L.C.

(57) ABSTRACT

An electronic apparatus includes a memory control part that carries out allocation and deallocation of a memory area in a memory space; a memory reorganization part that carries out a reorganization process of moving the memory area allocated by the memory control part and creating a contiguous free space in the memory space; and a reorganization control part that causes the reorganization part to carry out the reorganization process in a case where a first predetermined condition is met, and does not cause the reorganization part to carry out the reorganization process in a case where a second predetermined condition different from the first predetermined condition is met.

6 Claims, 10 Drawing Sheets

ELECTRONIC APPARATUS FOR MEMORY ALLOCATION AND REORGANIZATION

BACKGROUND OF THE INVENTION

1. Field of the Invention

The present invention relates to an electronic apparatus.

2. Description of the Related Art

Generally speaking, in memory control of an electronic apparatus such as a personal computer (PC), in a case of, for example, executing a program, a required memory area is allocated in a main memory such as a RAM, and the memory area that has been allocated is deallocated after the execution of the program is finished.

For such memory control, there are two methods, i.e., a method using fixed-length memory blocks and a method using variable-length memory blocks. In the method using fixed-length memory blocks, a memory is divided into fixed-length memory blocks, and a required memory area is allocated using respective blocks thereof. In the method using variable-length memory blocks, the size of a memory block to be used for allocation is dynamically changed according to the size of a required memory area.

In memory control using variable-length memory blocks, memory fragmentation may occur. That is, generally speaking, timing of deallocation is random. Thus, after repetitions of allocation and deallocation of memory areas, free space may be fragmented gradually, and available contiguous free spaces may be divided into smaller pieces.

Thus, a technique called "memory compaction" is known for getting rid of fragmented free spaces and carrying out reorganization to obtain long contiguous free spaces.

In addition to the technique of memory compaction, a technique of "garbage collection" is known for automatically deallocating memory areas which become unnecessary from among once allocated memory areas.

As a technique concerning garbage collection, Patent Reference No. 1 (Japanese Laid-Open Patent Application No. 2005-25727) discloses a configuration in which, in response to a garbage collection request, it is determined whether the requested garbage collection is to be carried out, based on a total amount of a calculated free storage capacity before garbage collection processing.

In the above-mentioned memory compaction, there may be a case where even after carrying out memory compaction that requires a processing time, a contiguous memory area having a desired size cannot be obtained.

On that point, Patent Reference No. 1 does not include a description concerning memory compaction, and a method of solving this problem concerning memory compaction is not described.

SUMMARY OF THE INVENTION

An electronic apparatus according to one aspect of the present invention includes a memory control part carrying out allocation and deallocation of a memory area in a memory space; a memory reorganization part carrying out a reorganization process of moving the memory area allocated by the memory control part and creating a contiguous free space in the memory space; and a reorganization control part that causes the reorganization part to carry out the reorganization process in a case where a first predetermined condition is met, and does not cause the reorganization part to carry out the reorganization process in a case where a second predetermined condition different from the first predetermined condition is met.

Other objects, features and advantages of the present invention will become more apparent from the following detailed description when read in conjunction with the accompanying drawings.

DETAILED DESCRIPTION OF THE EMBODIMENTS

Below, embodiments of the present invention will be described based on the drawings.

Figure 1:
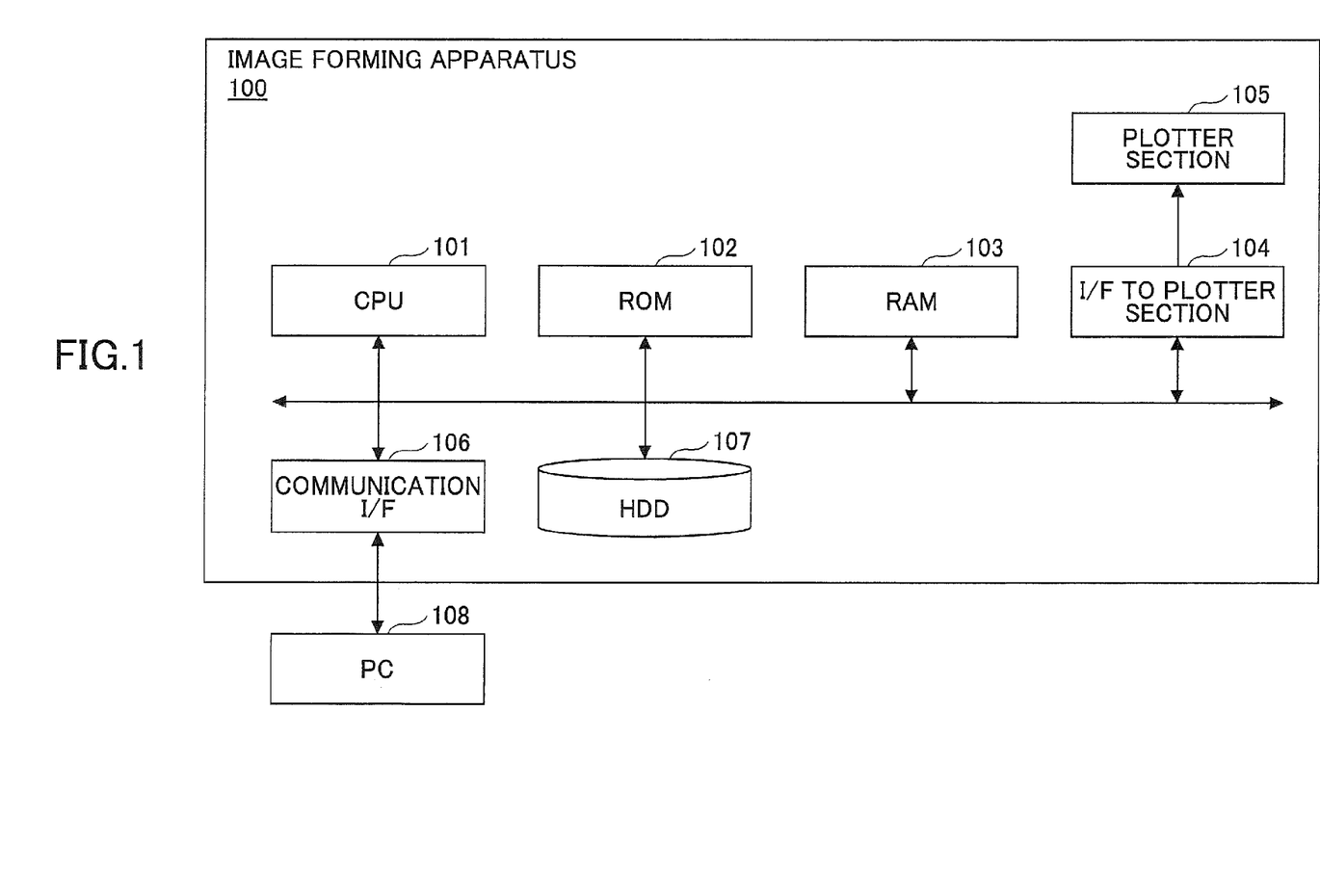
FIG. 1 is a block diagram showing a hardware configuration of an image forming apparatus in one embodiment of the present invention.

First, an image forming apparatus such as a printer, a multifunction peripheral (MFP) or the like which can form an image on a sheet of paper as one embodiment of an electronic apparatus according to the present invention will be described. FIG. 1 is a block diagram showing a hardware configuration of the image forming apparatus.

In FIG. 1, the image forming apparatus 100 includes a CPU 101, a ROM 102, a RAM 103, an I/F to plotter section 104, a plotter part 105, a communication I/F 106 and a HDD 107.

The CPU 101 is a control part controlling the entirety of the image forming apparatus 100 in an overall manner.

The ROM 102 is a read-only storage part, and stores programs to be executed by the CPU 101.

The RAM 103 is a storage part in which the CPU 101 expands the programs to execute. The RAM 103 is also used as a work area by the CPU 101 for carrying out various processes.

The I/F to plotter section 104 is a physical interface for carrying out communication with the plotter section 105 which includes various sorts of hardware for carrying out functions concerning image forming of the image forming apparatus 100 from supplying paper to fixing an image on the paper.

The communication I/F 106 is a physical interface for the image forming apparatus 100 to carry out communication with a PC 108 via a network, a USB cable or the like. As this interface, an appropriate one is prepared depending on the standard of the network, communication protocol to be used, and so forth.

The HDD 107 is a large-capacity storage part storing various data.

In the image forming apparatus 100, after the CPU 101 reads various programs from the ROM 102 and expands them in the RAM 103, the CPU 101 executes the various programs appropriately. Thus, the CPU 101 acts as a controlling section 200 that controls the image forming apparatus 100, and thus, the image forming apparatus 100 can receive printing data from the PC 108, and output the printing data to the plotter section 105 after carrying out necessary processes.

Figure 2:
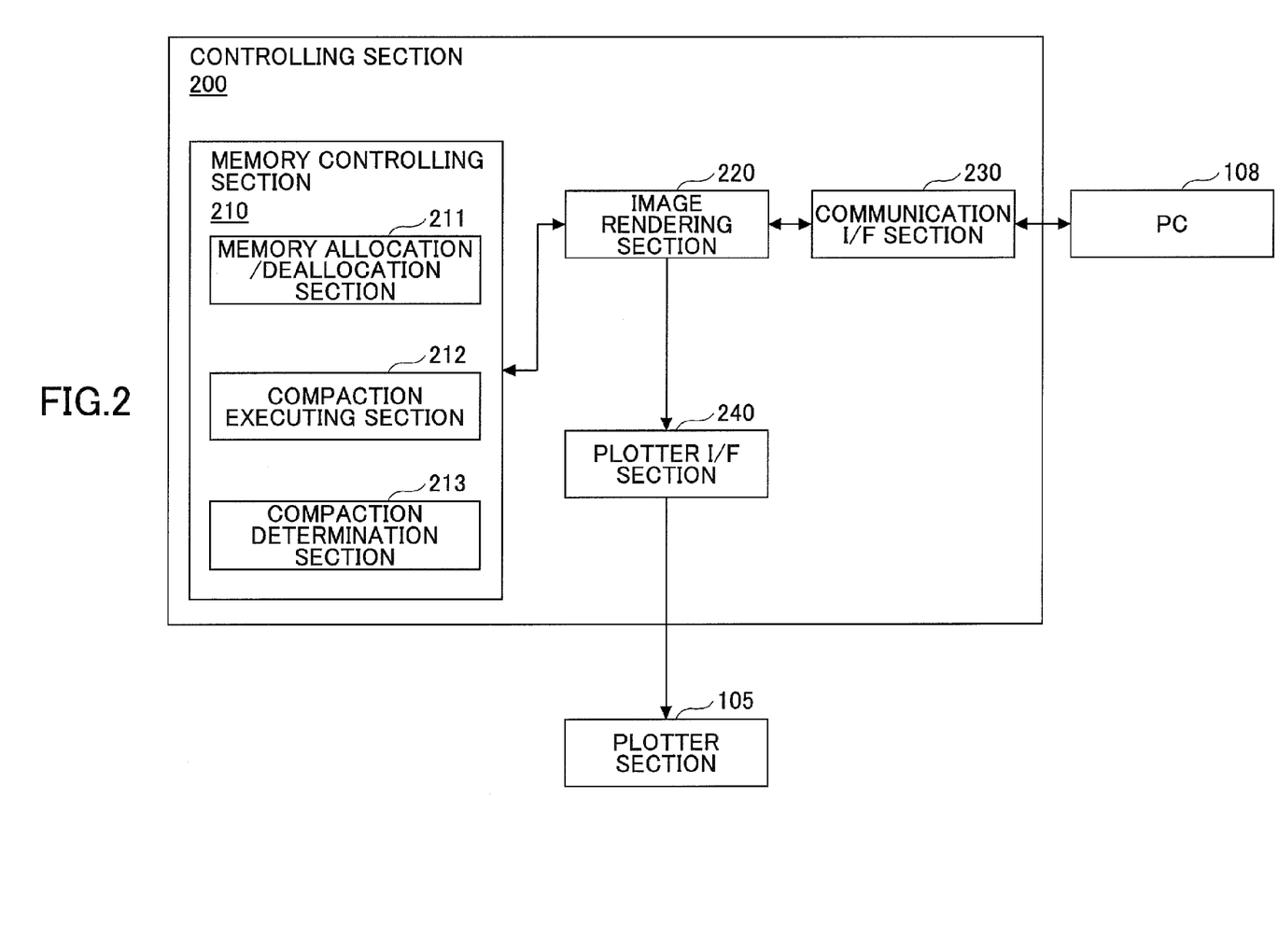
FIG. 2 is a block diagram showing functions of a controlling section of the image forming apparatus shown in FIG. 1.

FIG. 2 is a block diagram showing specific functions of the controlling section 200. As shown in FIG. 2, the controlling section 200 includes, as the functions, a memory controlling section 210, an image rendering section 220, a communication I/F section 230 and a plotter I/F section 240.

It is noted that these respective sections are those concerning features of the embodiment, and in addition thereto, the controlling part 200 includes functions not shown for controlling the image forming apparatus 100. Further, the functions of the respective sections are realized as a result of the CPU 101 expanding the corresponding programs in the RAM 103 and executing them. However, for the sake of convenience of description, description will be made as if the respective sections themselves carry out the functions.

Among the respective sections, the memory controlling section 210 has a function of managing memory areas of the RAM 103. The memory controlling section 210 includes, as the features of the embodiment, a memory allocation/deallocation section 211, a compaction executing section 212 and a compaction determination section 213.

Thereamong, the memory allocation/deallocation section 211 has functions of, in a case where the CPU 101 is to execute the various programs, a process concerning the program that is being executed is to process data having a large size, or so, allocating a memory area to the program or the process, and deallocating the allocated memory area in a case where the memory area becomes unnecessary. The memory allocation/deallocation section 211 corresponds to a memory control part.

Figure 3:
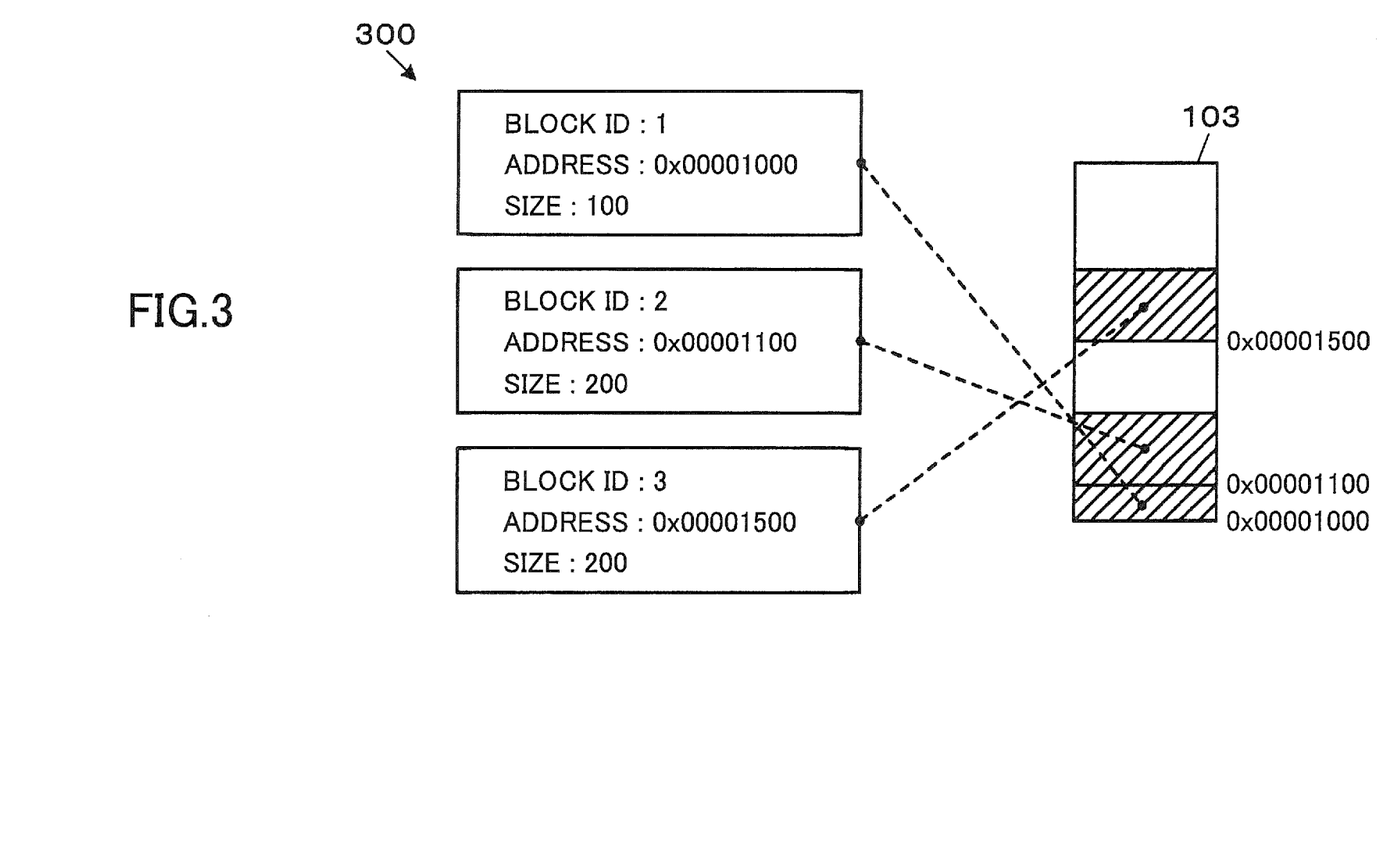
FIG. 3 illustrates a memory management method carried out by a memory allocation/deallocation section shown in FIG. 2.
Figure 4A:
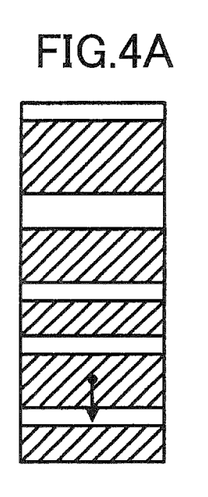
FIGS. 4A, 4B, 4C, 4D and 4E illustrate compaction carried out by a compaction executing section shown in FIG. 2.
Figure 4B:
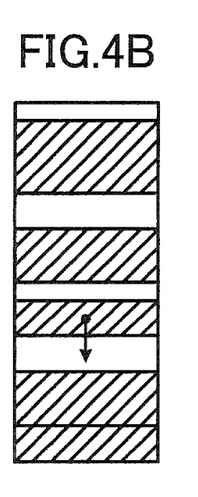
Figure 4C:
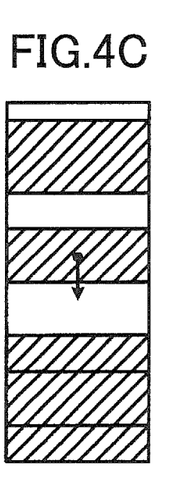
Figure 4D:
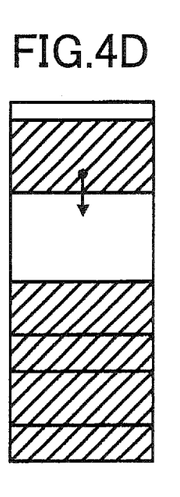
Figure 4E:
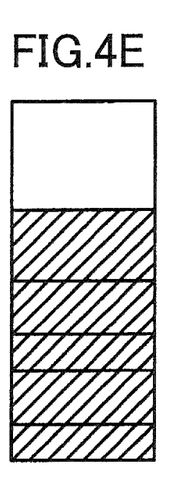

A memory management method that the memory allocation/deallocation section 211 carries out will now be described. FIG. 3 illustrates the memory management method. It is noted that a process of allocating a memory area using the RAM 103 to be used as a work area required for carrying out a rendering process of printing data and deallocating the allocated memory area after the rendering process, will be taken as an example.

It is assumed that upon the allocation, a memory space for allocating the memory area required for the rendering process of the printing data is previously set in the RAM 103, and the memory allocation/deallocation section 211 allocates the memory address in a range from the start address to the end address of the memory space.

Further, in the memory management method, the method of using variable-length memory blocks in which the size of the memory block is dynamically changed according to the required size of the memory area is used. The hatched areas in the RAM 103 shown in FIG. 3 denote memory areas already allocated, and blank areas denote free spaces.

First, the memory allocation/deallocation section 211 receives an allocation request for a necessary memory area for carrying out a rendering process of printing data from the image rendering section 220.

Then, the memory allocation/deallocation section 211 having received the allocation request for the memory area determines whether there is a contiguous free space having a size greater than or equal to the memory area to allocate using the memory space of the RAM 103, and allocates the memory area from the start address of the memory addresses when there is the contiguous free space having a size greater than or equal to the memory area to allocate using the memory space of the RAM 103.

In the case of FIG. 3, a memory block better suited for the size of the memory area required for carrying out the rendering process of the printing data is used for the allocation from the start address (0x00001000). Then, a set of management data 300 is created including a block ID that is an identifier of the thus allocated lump of memory area, and the start address and the size of the memory area.

Next, when receiving an allocation request for a memory area again, the memory allocation/deallocation section 211 allocates the memory area using the address (0x00001100), subsequent to the end address of the previously allocated memory block, as the start address so that no space is left between these memory areas, and creates a set of management data 300 in the same way.

On the other hand, although not shown, a once allocated memory area is deallocated, in a case where a deallocation request for the memory area has been received from the allocation request source, a predetermined period of time has elapsed from the allocation, or so. After the deallocation is thus carried out, such a state is created that a corresponding free space exists between already allocated areas.

For example, the area between the memory area of ID=2 and the memory area of ID=3 in FIG. 3 corresponds thereto. Such a free space existing between already allocated areas is referred to as a "fragmentation". When the fragmentation is created, there may occur a case where although sufficient free spaces exist in the entirety of the RAM 103, there is no contiguous free space having a size to allocate, and thus, allocation cannot actually be carried out.

Respective sets of management data 300 created in sequence upon allocation of memory areas are stored in a system area that is prepared, for example, in the RAM 103, in a form of a memory management table. By configuring the memory management table in such a manner that the memory addresses are arranged in an ascending order, it is possible to calculate the size of a fragmentation that has been created, using the memory addresses and the sizes of the adjacent sets of management data. For example, it is possible to calculate the size of the above-mentioned fragmentation shown in FIG. 3, using the memory addresses and the sizes included in the sets of management data 300 of the respective block IDs 2 and 3. Further, by summing up the sizes of the memory areas of the respective sets of the management data 300, it is also possible to calculate the total size of the already allocated memory areas.

Further, in a case of deallocating a memory area, the memory allocation/deallocation section 211 searches the memory management table for the corresponding set of management data 300. When having found it, the memory allocation/deallocation section 211 deallocates the memory area of the memory block having the block ID of the set of management data, and also, deletes the corresponding set of management data from the memory management table.

Next, the compaction executing section 212 carries out a reorganization process of moving a memory area(s) allocated by the memory allocation/deallocation section 211 and creating a contiguous free space(s) in the memory space. The compaction executing section 212 corresponds to a memory reorganization part. A compaction carried out by the compaction executing section 212 will be described using FIGS. 4A, 4B, 4C, 4D and 4E. FIGS. 4A, 4B, 4C, 4D and 4E illustrate a compaction.

When the compaction executing section 212 carries out a compaction, allocation destinations of respective memory blocks indicated by corresponding sets of management data 300 are moved, one by one, in one direction indicted by the arrows shown in FIGS. 4A, 4B, 4C and 4D, for getting rid of fragmented free space(s) (fragmentation(s)) created between already allocated memory areas, so that a contiguous free space(s) can be obtained (see FIGS. 4A to 4E).

Such a process of moving of an allocation destination can be achieved as follows. That is, after the contents of a certain memory block is copied to a moving-destination memory area, the start address of the corresponding set of management data 300 is changed accordingly. Then, after the allocation destination of one memory block is thus moved, the allocation destination of the subsequent memory block is moved in such a manner that the subsequent memory block starts from the address subsequent to the end address of the memory area that has been moved previously. By repeating this process in succession, it is possible to get rid of the fragmentations.

Next, the compaction determination section 213 determines whether to carry out such a compaction, and carries out control of causing the compaction executing section 212 to carry out a compaction or not causing the compaction executing section 212 to carry out a compaction according to the determination result. It is noted that specific methods of determining whether to carry out a compaction will be described later using FIGS. 5 to 10.

The image rendering section 220 receives printing data to be printed indicated by a page description language (PDL) from the PC 108, analyzes the PDL of the printing data and draws bitmap data of such a form that the plotter section 105 can carry out image forming, and transmits image data including the drawn bitmap data to the plotter section 105. This rendering process is carried out using, as a work area, a memory area of the RAM 103 allocated by the memory allocation/deallocation section 211. Further, the above-mentioned reception of the printing data is realized by the communication function of the communication I/F section 230, and the above-mentioned transmission of the image data is realized by the communication function of the plotter I/F section 240.

Figure 5:
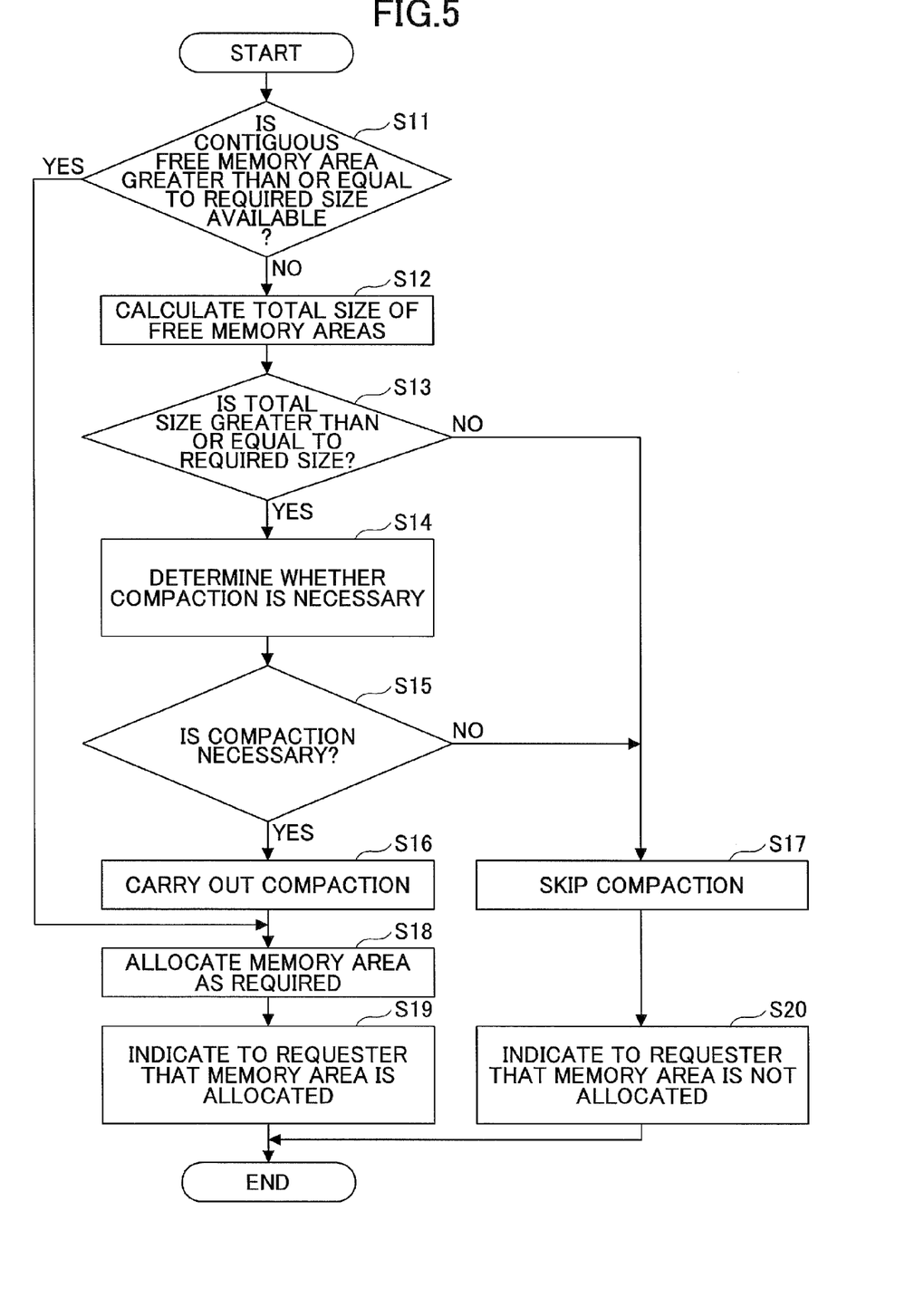
FIG. 5 is a flowchart showing a process carried out by a memory controlling section in a case of having received an allocation request for a memory area.

Next, a process carried out by the memory controlling section 210 in a case of having received an allocation request for a memory area from the image rendering section 220 will be described. FIG. 5 is a flowchart showing a basic compaction determination process.

It is noted that the process concerning this flowchart is realized as a result of the CPU 101 executing a predetermined program(s), and corresponds to the respective functions of the memory allocation/deallocation section 211, the compaction executing section 212 and the compaction determination section 213. However, for the sake of convenience of description, description will be made as if the process is carried out by the memory controlling section 210 itself.

In a case of having received an allocation request for a memory area, the memory controlling section 210 carries out the following steps in sequence. First, the memory controlling section 210 determines whether there is a contiguous free memory area(s) having a size greater than or equal to a required size (step S11). This determination can be made by reading the management data 300.

Then, when having determined that a corresponding free memory area(s) exists, the memory controlling section 210 allocates a memory block (as a memory area) of the size according to the allocation request using any one of the thus found memory area(s) to the allocation request source (step S18). Thereafter, the memory controlling section 210 notifies the allocation request source of having allocated the memory area (step S19), and finishes the process.

On the other hand, when having determined that there is no corresponding free memory area(s) in step S11, it is not possible to allocate a memory area in this state. Thus, the memory controlling section 210 then carries out the steps, in sequence, starting from step S12 including a determination as to whether it is possible to obtain a contiguous free space by carrying out a compaction.

In these steps, the memory controlling section 210 first calculates the total size of the free spaces that exist in the memory space available for dynamically allocating (step S12), and determines whether the total size of the free spaces is greater than or equal to the size of the memory area to allocate (step S13).

It is noted that the total size of the free spaces in the memory space is calculated from subtracting the total size of the already allocated memory areas from the size of all the memory areas of the RAM 103.

Then, in a case where the determination result of step S13 is NO, it can be seen that it is not possible to obtain a contiguous free space having a necessary size even after carrying out a compaction and thus it is not possible to carry out allocation according to the request. Thus, the memory controlling section 210 determines not to carry out a compaction (step S17). Thereafter, the memory controlling section 210 notifies the allocation request source of not having been able to carry out allocation of a memory area (step S20), and finishes the process.

On the other hand, in a case where the determination result of step S13 is YES, the memory controlling section 210 carries out a determining process of determining whether to carry out a compaction (step S14). Then, when having determined that it is necessary to carry out a compaction (step S15 YES), the memory controlling section 210 carries out a compaction (step S16), and, the same as the above-mentioned case where the determination result of step S11 is YES, the memory controlling section 210 allocates a memory area according to the allocation request using the contiguous free space obtained from the compaction (step S18). On the other hand, when having determined that it is not necessary to carry out a compaction (step S15 NO), the memory controlling section 210 does not carry out a compaction (step S17), and, the same as the above-mentioned case where the determination result of step S13 is NO, the memory controlling section 210 does not carry out allocation of a memory area either. Thereafter, the memory controlling section 210 notifies the allocation request source of not having been able to carry out allocation of a memory area (step S20), and finishes the process.

In the process of FIG. 5, no compaction is to be carried out in a case where the total size of the free spaces is less than the size of the memory area to allocate, in step S13. Thus, it is possible to avoid carrying out a compaction process that requires a heavy processing load even in a case where it is clear that it is not possible to carry out allocation according to the request even after carrying out the compaction. Thus, it is possible to improve the efficiency of memory management.

Further, in a case where the total size of the free spaces is less than the size of the memory area to allocate, even the determination process of step S14 is not carried out. Thus, it is possible to reduce the processing load of the determination as to whether to carry out a compaction.

It is noted that among the above-mentioned respective steps, the steps S12 to S15 correspond to a determination part.

Controlling as to whether to carry out a compaction in step S15 corresponds to a reorganization control part.

Next, some variations of the process shown in FIG. 5 will be described. That is, other examples of the process shown in FIG. 5 will be described.

[Second Example: FIG. 6 and FIGS. 7A to 7F]

Figure 6:
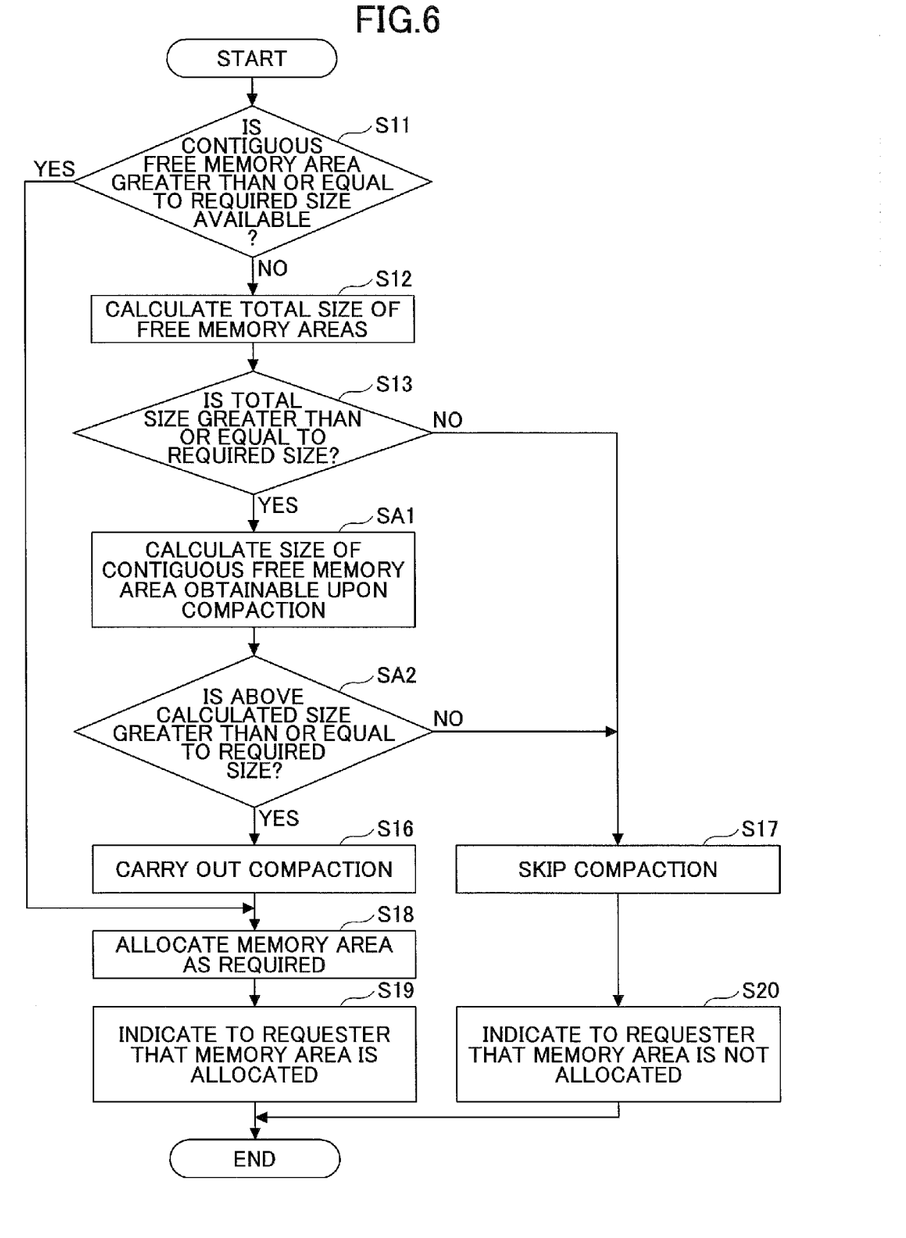
FIG. 6 is a flowchart showing another example (second example) of the process of FIG. 5.
Figure 7A:
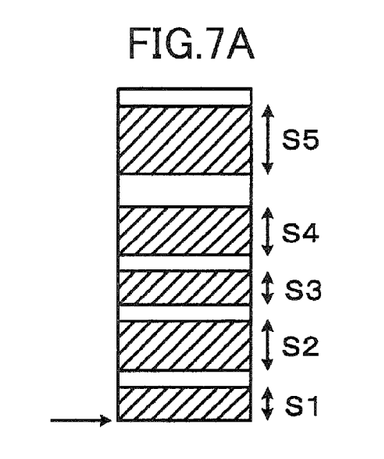
FIGS. 7A, 7B, 7C, 7D, 7E and 7F show one example of calculating the size of a contiguous free space created in a memory space as a result of compaction.
Figure 7B:
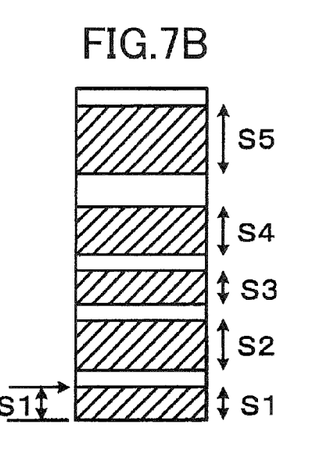
Figure 7C:
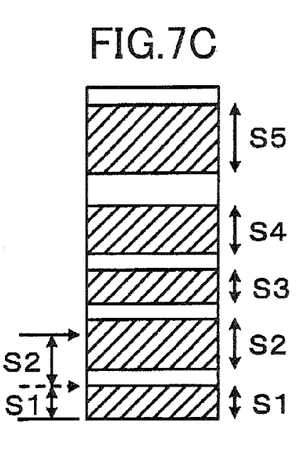
Figure 7D:
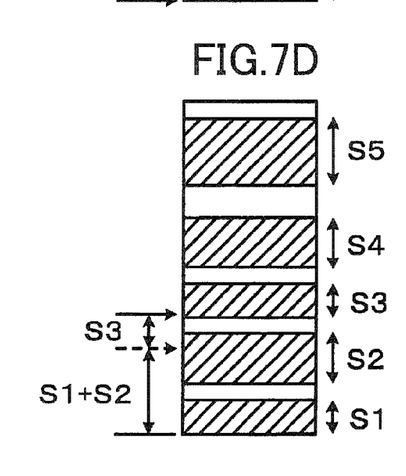
Figure 7E:
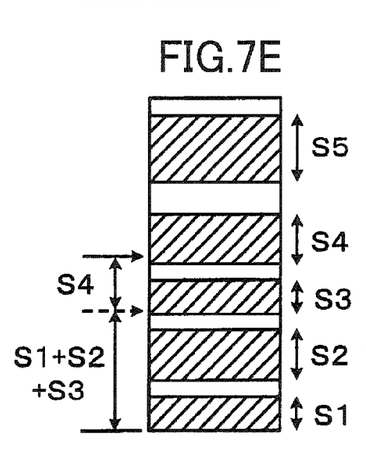
Figure 7F:
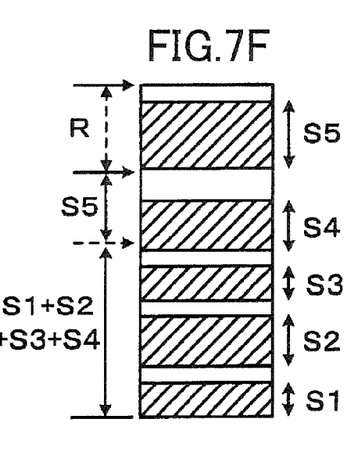

FIG. 6 shows a second example of the process shown in FIG. 5.

It is noted that the steps S11 to S13 and S16 to S20 are the same as those shown in FIG. 5. What is different is only that steps SA1 and SA2 are more concretized than steps S14 and S15 of FIG. 5. Thus, description will now be made with a focus on steps SA1 and SA2.

In the process of FIG. 6, in a case where the determination result of step S13 is YES, the memory controlling section 210 calculates the size of a contiguous free space obtainable in the memory space in a case of carrying out a compaction (step SA1). Then, when having determined that the calculated size is greater than or equal to the size of the memory area to allocate (step SA2 YES), the memory controlling section 210 carries out a compaction (step S16), and, the same as the case where the determination result of step S11 is YES, the memory controlling section 210 allocates the memory area according to the allocation request using the contiguous free space obtained from the compaction (step S18). On the other hand, when having determined that the calculated size is less than the size of the memory area to allocate (step SA2 NO), the memory controlling section 210 does not carry out a compaction (step S17), and, the same as the case where the determination result of step S13 is NO, the memory controlling section 210 does not carry out allocation of a memory area either. Thereafter, the memory controlling section 210 notifies the allocation request source of not having been able to carry out allocation of a memory area (step S20), and finishes the process.

A specific method of calculation in step SA1 will now be described using FIGS. 7A to 7F. FIGS. 7A to 7F show one example of a method of calculating the size of a contiguous free space obtainable in the memory space as a result of a compaction. In FIGS. 7A to 7F, S1 to S5 denote the sizes of respective allocated memory areas, respectively.

Upon the calculation, when all the memory areas that have been allocated can be moved, the total sum of the memory areas as movement destinations is calculated for a case where the allocation destinations of the memory areas that have been allocated are moved in such a manner that the allocation destinations are arranged, from one end, without any spaces therebetween (contiguous). In the example of FIGS. 7A to 7F, the total sum is a value obtained from adding up S1 to S5. Then, the thus obtained value is subtracted from the total size of the all dynamically allocatable memory areas. The subtraction result R is the size of the contiguous free area obtainable in the memory space in a case of carrying out the compaction.

In the case where all the memory areas that have been allocated can be moved, the thus obtained value is equal to the value of the total size of the free spaces calculated in step S12. However, in a case where some of the memory areas that have been allocated cannot be moved on the ground of processing, all the memory areas that can be dynamically allocated are separated by the memory areas that cannot be moved into respective areas, and in each one of these areas, the movable memory areas are moved from one end without any spaces therebetween. In this case, even after the compaction is carried out, the fragmentations cannot be got rid of completely. Thus, the size of the free space obtainable in the memory space in a case of carrying out a compaction may become smaller than the total size of the free spaces calculated in step S12. Which memory areas cannot be moved may be previously described in the management data 300.

In a case where such a situation is assumed, calculating a contiguous free space that will be actually obtained in step SA1 is advantageous.

In the process of FIG. 6, a compaction is carried out in a case where the size of the contiguous free space actually obtainable from the compaction is greater than or equal to the size of the memory area to allocate. Thus, it is possible to avoid such a situation of not being able to obtain the size of the memory area to allocate even after carrying out the compaction that requires a processing time. Therefore, it is possible to avoid a useless compaction. Thus, it is possible to improve the efficiency of memory management.

Figure 8:
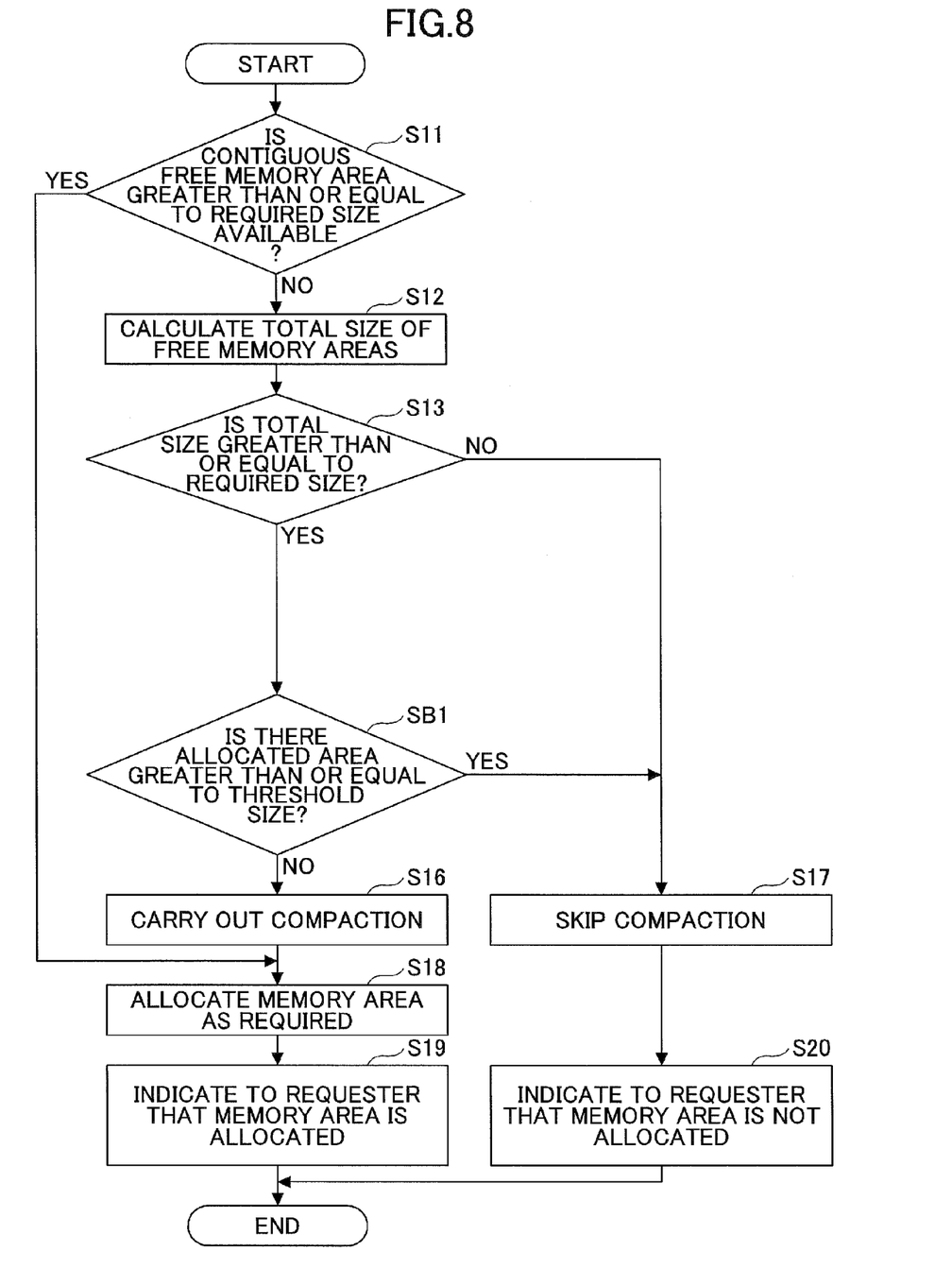
FIG. 8 is a flowchart showing yet another example (third example) of the process of FIG. 5.

[Third Example FIG. 8]

Next, FIG. 8 shows a third example of the process shown in FIG. 5.

It is noted that the steps S11 to S13 and S16 to S20 are the same as those shown in FIG. 5. What is different is only that step SB1 is more concretized than steps S14 and S15 of FIG. 5. Thus, description will now be made with a focus on step SB1.

In the process of FIG. 8, in a case where the determination result of step S13 is YES, it is determined whether or not there is a memory area from among the already allocated memory areas having a size greater than or equal to a predetermined threshold (step SB1). When the determination result of step SB1 is NO, the memory controlling section 210 carries out a compaction (step S16), and the same as the case where the determination result of step S11 is YES, the memory controlling section 210 allocates the memory area according to the allocation request using the contiguous free space obtained from the compaction (step S18). On the other hand, when the determination result of step SB1 is YES, the memory controlling section 210 does not carry out a compaction (step S17), and the same as the case where the determination result of step S13 is NO, the memory controlling section 210 does not carry out allocation of a memory area either. Thereafter, the memory controlling section 210 notifies the allocation request source of not having been able to carry out allocation of a memory area (step S20), and finishes the process.

The reason for using step SB1 as a criterion of determining whether to carry out a compaction in the process of FIG. 8 is that when there is a memory area having a size greater than or equal to the threshold, it is expected that even without carrying out a compaction, a contiguous free space having a size greater than or equal to the threshold can be obtained through natural deallocation, and it becomes possible to allocate a memory area after the natural deallocation.

That is, when a large memory area has been currently allocated, it is expected that as long as this memory area is deallocated, a contiguous free memory area having a size sufficient to carry out allocation concerning the allocation request can be obtained, even without carrying out a compaction. Consequently, in such a case, it is expected that it is possible to carry out the allocation earlier by waiting for deallocation of the memory area than carrying out a compaction process that requires time.

It is noted that the above-mentioned threshold may preferably be greater than or equal to the size of the memory area to allocate. Thus, it is guaranteed to be positively able to allocate the memory area when the corresponding memory area having the size greater than or equal to the threshold is deallocated.

Further, in a case where the determination result of step SB1 is YES, it is expected that without carrying out a compaction, allocation cannot be carried out immediately. Thus, the memory controlling section 210 may wait until the memory area required for the allocation is obtained as a result of deallocation of the memory area.

Further, in the process of FIG. 8, in a case where the determination result of step SB1 is YES, the memory controlling section 210 does not carry out a compaction (step S17) and notifies the allocation request source of a result of not having carried out the allocation. This is because, so long as the determination result of step S11 is NO and also it has been determined not to carry out a compaction, this case is regarded as not having been able to carry out the allocation for the present, because it is not possible to immediately allocate the memory area according to the request.

It is expected that the allocation request source will transmit an allocation request again when still requiring a memory area. Then, it is expected that, when the memory area found out in step SB1 is deallocated before receiving the request thus again transmitted, the determination result of step S11 becomes YES at the present time, and the allocation according to the request can be carried out.

However, in a case where merely returning a response to the allocation request source indicating that the allocation has not be carried out is inconvenient, a response requiring a retry may be returned instead. Further, it is also possible that the memory controlling section 210 waits to return a response for a predetermined period of time, and, when a memory area required for the allocation can be obtained from deallocation of a memory area or so during the predetermined period of time, the memory controlling section 210 proceeds to step S11 and carries out the allocation.

Figure 9:
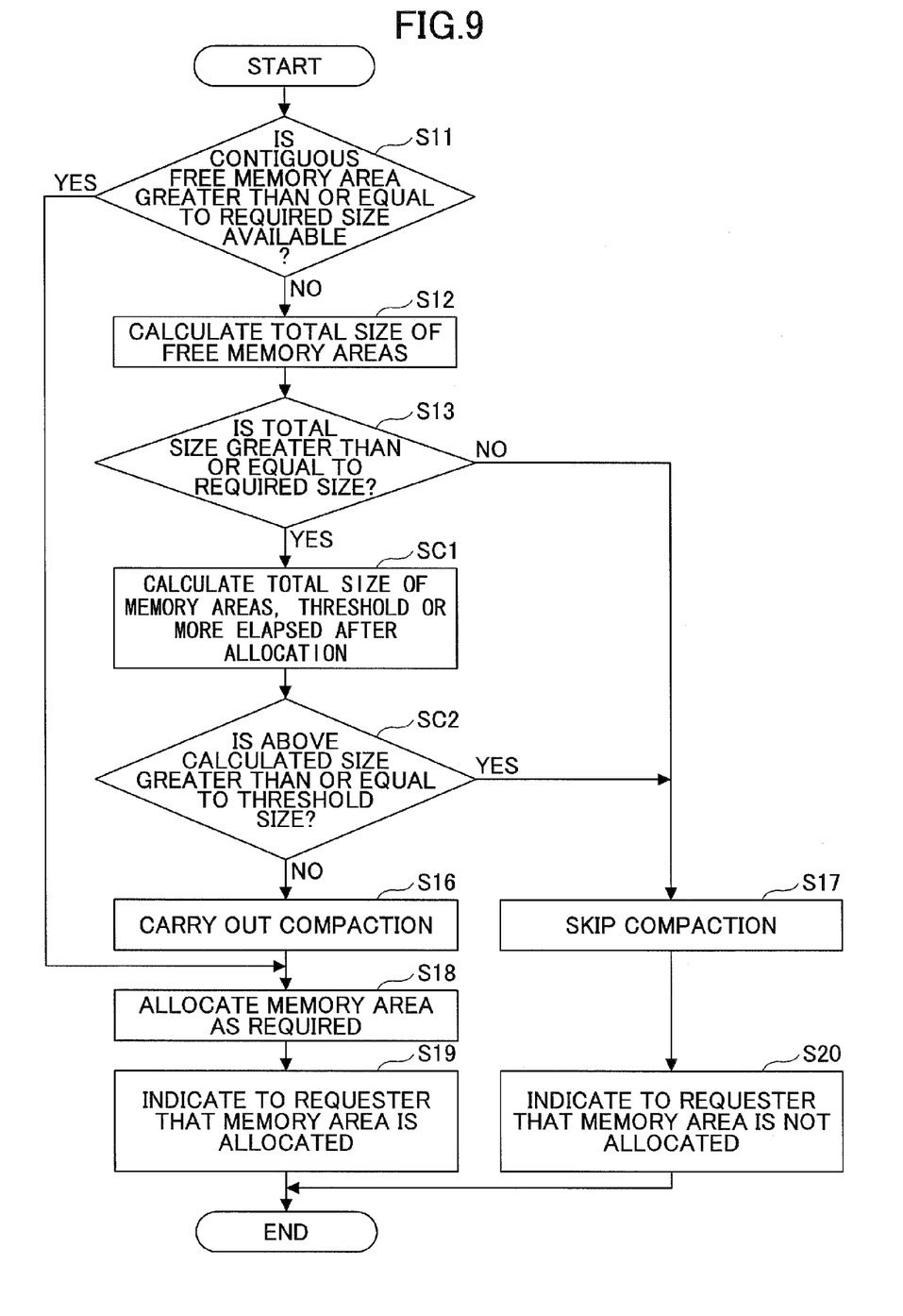
FIG. 9 is a flowchart showing yet another example (fourth example) of the process of FIG. 5.

[Fourth Example FIG. 9]

FIG. 9 shows a fourth example of the process shown in FIG. 5.

It is noted that the steps S11 to S13 and S16 to S20 are the same as those shown in FIG. 5. What is different is only that steps SC1 and SC2 are more concretized than steps S14 and S15 of FIG. 5. Thus, description will now be made with a focus on steps SC1 and SC2.

In the process of FIG. 9, in a case where the determination result of step S13 is YES, the memory controlling section 210 calculates a total size of memory areas, from among the already allocated memory areas, for which a certain threshold period of time or more has elapsed after allocation (step SC1). In a case of adopting the process of the fourth example, the times at which the memory areas have been allocated are registered in the management data for the calculation, respectively.

Then, when the calculated total size is less than a predetermined threshold (SC2 NO), the memory controlling section carries out a compaction (step S16), and the same as the case where the determination result of step S11 is YES, the memory controlling section 210 allocates the memory area according to the allocation request using the contiguous free space obtained from the compaction (step S18). On the other hand, when the calculated total size is greater than or equal to the predetermined threshold (SC2 YES), the memory controlling section 210 does not carry out a compaction (step S17), and the same as the case where the determination result of step S13 is NO, the memory controlling section 210 does not carry out allocation of a memory area either. Thereafter, the memory controlling section 210 notifies the allocation request source of not having been able to carry out allocation of a memory area (step S20), and finishes the process.

In the process of FIG. 9, the reason for using the determination of step SC2 as a criterion for determining whether to carry out a compaction is as follows. That is, when there are many memory areas for which long period of times have elapsed from their allocation, it is expected that these memory areas will be deallocated within short periods of time, a contiguous free area having a size greater than or equal to a threshold will be obtained from the deallocation even without carrying out a compaction, and thus allocation of a memory area can be carried out after the deallocation.

However, in the process of FIG. 9, it is not determined whether the memory areas for which long periods of time have elapsed from their allocations are contiguous. Thus, it is preferable to determine the above-mentioned predetermined threshold for the calculated total size in step SC2 to be greater than the size required for allocation, for counting on a contiguous free area having the size required for the allocation being obtained from the deallocation.

Conversely, when the memory areas for which long periods of time have elapsed from their allocations exist contiguously (therebetween, a free space(s) may be inserted as long as no other already allocated memory area(s) is included), it is expected that all of these memory areas will be deallocated within a short period of time, and a contiguous memory area will become free. In this case, the above-mentioned predetermined threshold for the calculated total size in step SC2 may be the same as the size required for allocation. Further, it is preferable that the value to be compared with the predetermined threshold in step SC2 is the total size of the contiguous memory areas (in a case where a free space(s) is inserted therebetween, the size thereof is also included).

Further, it is preferable to determine the above-mentioned threshold period of time in step SC1 to be on the order of an average deallocation period of time, in a case where a memory area is to be allocated using the RAM 105 as a work area required for carrying out a rendering process of printing data. The average deallocation period of time is an average of a period of time from allocation of a memory area to deallocation of the memory area after the finish of the rendering process. Thus, the above-mentioned threshold period of time in step SC1 can be determined based on the average deallocation period of time.

This average deallocation period of time depends on the type of the page description language (PDL), the performance of the CPU 101, the performance of the plotter section 105 that carries out the rendering process, and is expected to be, for example, on the order of 3 to 5 seconds.

Further, the above-mentioned not carrying out allocation of a memory area in a case where the determination result of step SC2 is YES in the process of FIG. 9 has the meaning the same as or similar to the case of FIG. 8, and thus, variants the same as or similar to those in the case of FIG. 8 are conceivable.

Figure 10:
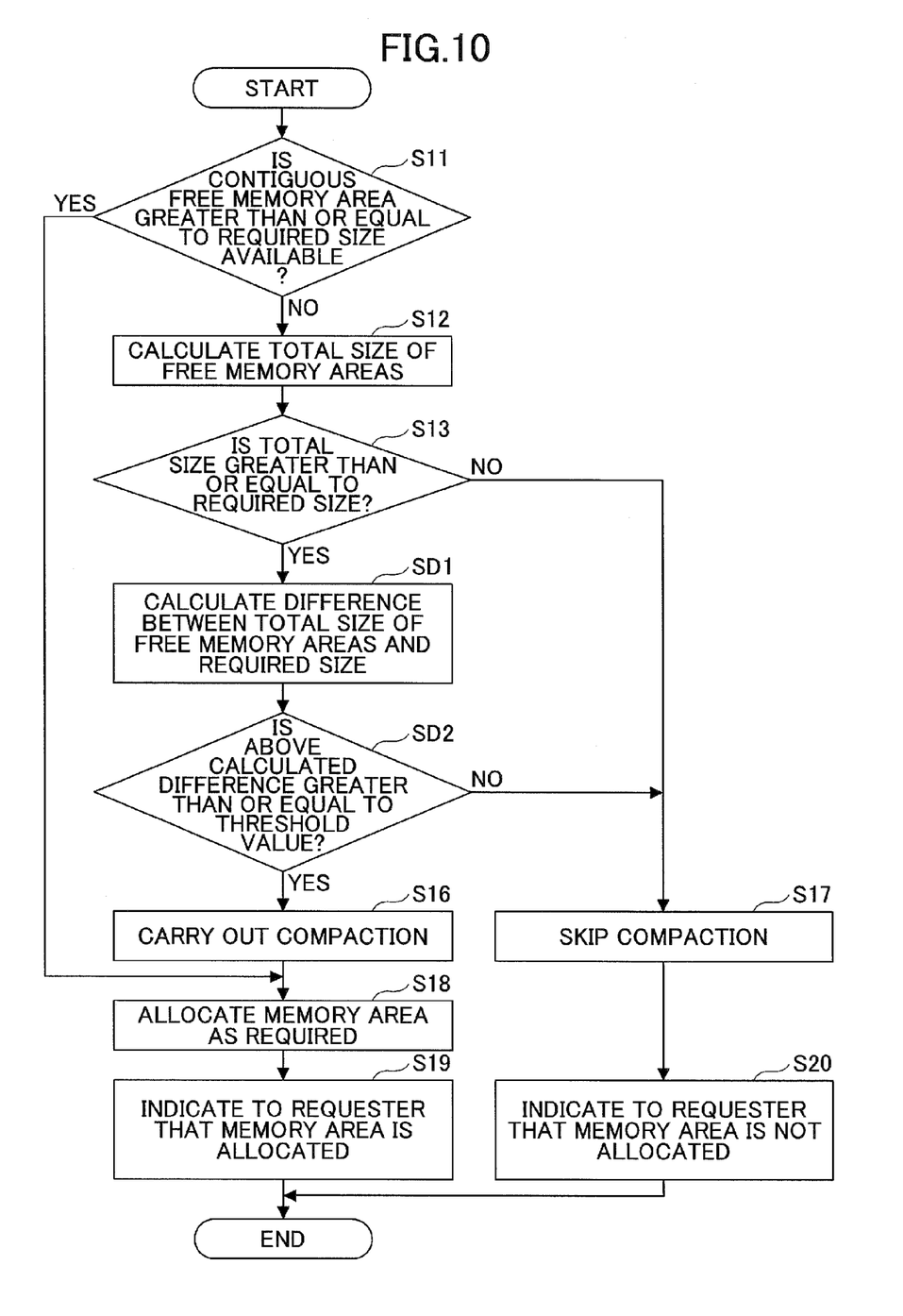
FIG. 10 is a flowchart showing yet another example (fifth example) of the process of FIG. 5.

[Fifth Example FIG. 10]

FIG. 10 shows a fifth example of the process shown in FIG. 5.

It is noted that the steps S11 to S13 and S16 to S20 are the same as those shown in FIG. 5. What is different is only that steps SD1 and SD2 are more concretized than steps S14 and S15 of FIG. 5. Thus, description will now be made with a focus on steps SD1 and SD2.

In the process of FIG. 10, in a case where the determination result of step S13 is YES, the memory controlling section 210 calculates the difference between the total size of the free spaces in the memory space calculated in step S12 and the size of the memory area to allocate (step SD1). Then, when the calculated difference is greater than or equal to a predetermined threshold (step SD2 YES), the memory controlling section 210 carries out a compaction (step S16), and the same as the case where the determination result of step S11 is YES, the memory controlling section 210 allocates the memory area according to the allocation request using the contiguous free space obtained from the compaction (step S18). On the other hand, when the calculated difference is less than the predetermined threshold (step SD2 NO), the memory controlling section 210 does not carry out a compaction (step S17), and the same as the case where the determination result of step S13 is NO, the memory controlling section 210 does not carry out allocation of a memory area either. Thereafter, the memory controlling section 210 notifies the allocation request source of not having been able to carry out allocation of a memory area (step S20), and finishes the process.

The reason for using the determination of step SD2 as a criterion for determining whether to carry out a compaction in the process of FIG. 10 is as follows. That is, in a case where the difference between the size of the free spaces and the size of the memory area to allocate according to the request is large, it is expected that the number of fragmentations that will be gotten rid of by the compaction is great and the effect of the compaction is great. The fact that this difference is great means that, in together consideration of the determination result of step S11 being NO, there are many fragmented areas in the memory space having sizes less than a size for which allocation has been currently required. Thus, by carrying out a compaction only in such a case, it is possible to improve the efficiency of compactions, and it is possible to improve the efficiency of memory management as a whole.

Thus, according to the embodiments, it is possible to solve the above-mentioned problem concerning memory compaction, and improve the efficiency of memory management.

The electronic apparatus has been described by the embodiments. However, the present invention is not limited to these specifically disclosed embodiments, and variations and modifications may be made without departing from the scope of the present invention.

For example, although the specific configuration of the image forming apparatus 100, the contents of the process of determining whether to carry out a compaction and so forth have been described, the present invention is not limited thereto.

Further, in the above-mentioned second to fifth examples, the steps S12 and S13 are carried out, respectively, in common. However, these steps are not necessarily essential, and may be skipped. Thereby, it is possible to simplify the process of determining whether to carry out a compaction in each one of the respective examples. However, in a case where these steps are skipped in the fifth example, the total size of the free spaces in the memory space should be additionally calculated for the purpose of using the calculation result for calculating the difference in step SD1.

Further, the functions concerning memory control of the memory controlling section 210 have been described taking the RAM 103 as an example. However, it is also possible to apply these functions to memory control of another storage device such as the HDD 107. Further, the present invention can be applied not only to the image forming apparatus 100, but also to any electronic apparatuses including storage parts that can carry out dynamic allocation, including a general-purpose computer such as PC, as long as they include hardware realizing the respective functions of the memory controlling section 210 shown in FIG. 2, for example.

Further, the respective examples described above can be combined together freely unless they contradict each other.

The present application is based on Japanese Priority Application No. 2012-041534, filed on Feb. 28, 2012, the entire contents of which are hereby incorporated herein by reference.

What is claimed is:

1. An electronic apparatus comprising:
a memory control part that carries out allocation and deallocation of a memory area in a memory space;
a memory reorganization part that carries out a reorganization process of moving the memory area allocated by the memory control part and creating a contiguous free space in the memory space;
a reorganization control part that causes the reorganization part to carry out the reorganization process in a case where a first predetermined condition is met, and does not cause the reorganization part to carry out the reorganization process in a case where a second predetermined condition different from the first predetermined condition is met; and
a determination part that determines whether the memory areas that have been already allocated by the memory control part include the memory area having a size greater than or equal to a predetermined threshold in a case where there is no contiguous memory area in the memory space having a size greater than or equal to a size of a memory area to be allocated when the memory control part is to allocate the memory area, wherein
the reorganization control part causes the reorganization part to carry out the reorganization process in a case where, as the first predetermined condition, the determination part has determined that no memory area exists having a size greater than or equal to the predetermined threshold, and does not cause the reorganization part to carry out the reorganization process in a case where, as the second predetermined condition, the determination part has determined that the memory area exists having the size greater than or equal to the predetermined threshold.

2. An electronic apparatus comprising:
a memory control part that carries out allocation and deallocation of a memory area in a memory space;
a memory reorganization part that carries out a reorganization process of moving the memory area allocated by the memory control part and creating a contiguous free space in the memory space;
a reorganization control part that causes the reorganization part to carry out the reorganization process in a case where a first predetermined condition is met, and does not cause the reorganization part to carry out the reorganization process in a case where a second predetermined condition different from the first predetermined condition is met;
and a determination part that determines whether a total size of the memory areas, from among the already allocated memory areas, for which a threshold period of time or more has elapsed after allocation, is greater than or equal to a predetermined threshold in a case where there is no contiguous memory area in the memory space having a size greater than or equal to a size of a memory area to be allocated when the memory control part is to allocate the memory area, wherein
the reorganization control part does not cause the reorganization part to carry out the reorganization process in a case where, as the second predetermined condition, the determination part has determined that the total size is greater than or equal to the predetermined threshold, and causes the reorganization part to carry out the reorganization process in a case where, as the first predetermined condition, the determination part has determined that the total size is less than the predetermined threshold.

3. The electronic apparatus as claimed in claim 1, wherein the predetermined threshold is the size of the memory area to be allocated.

4. The electronic apparatus as claimed in claim 1, wherein
in a case where there is no contiguous memory area in the memory space having a size greater than or equal to the size of the memory area to be allocated when the memory control part is to allocate the memory area, the determination part determines whether a total size of free spaces in the memory space is greater than or equal to the size of the memory area to be allocated,
in a case of having determined that the total size of free spaces in the memory space is greater than or equal to the size of the memory area to be allocated, the determination part determines whether the memory areas that have been already allocated by the memory control part include the memory area having a size greater than or equal to the predetermined threshold, and
the reorganization control part does not cause the memory reorganization part to carry out the reorganization process in a case where the determination part has determined that the total size of free spaces in the memory space is less than the size of the memory area to be allocated.

5. The electronic apparatus as claimed in claim 2, wherein
in a case where there is no contiguous memory area having a size greater than or equal to the size of the memory area to be allocated in the memory space when the memory control part is to allocate the memory area, the determination part determines whether a total size of free spaces in the memory space is greater than or equal to the size of the memory area to be allocated,
in a case of having determined that the total size of free spaces in the memory space is greater than or equal to the size of the memory area to be allocated, the determination part determines whether the total size of the memory areas, from among the already allocated memory areas, for which the threshold period of time or more has elapsed after allocation, is greater than or equal to the predetermined threshold, and
the reorganization control part does not cause the memory reorganization part to carry out the reorganization process in a case where the determination part has determined that the total size of free spaces in the memory space is less than the size of the memory area to be allocated.

6. The electronic apparatus as claimed in claim 4, wherein the predetermined threshold is the size of the memory area to be allocated.

* * * * *